United States Patent [19]

Hoelzel

[11] Patent Number: 4,562,616
[45] Date of Patent: Jan. 7, 1986

[54] METHOD AND APPARATUS FOR EXTRACTING MEAT FROM CRAB CORES

[76] Inventor: Omar F. Hoelzel, 106 Parkview Ave., Portsmouth, Va. 23704

[21] Appl. No.: 581,111

[22] Filed: Feb. 16, 1984

[51] Int. Cl.$^4$ .................................. A22C 29/02
[52] U.S. Cl. ............................................ 17/46
[58] Field of Search ............... 17/46, 71, 1 G; 210/360.1, 361, 380.1

[56] References Cited

U.S. PATENT DOCUMENTS

| | | | |
|---|---|---|---|
| 1,520,190 | 12/1924 | Lieberman | 17/71 |
| 1,533,018 | 4/1925 | Lieberman | 17/71 |
| 1,565,342 | 12/1925 | Umrath | 17/71 |
| 2,308,697 | 1/1943 | Kivley | 210/360.1 |
| 2,708,318 | 5/1955 | Frazee et al. | 210/361 X |
| 4,189,850 | 2/1980 | Dieterich et al. | 210/380.1 X |

Primary Examiner—Willie G. Abercrombie
Attorney, Agent, or Firm—Harvey B. Jacobson

[57] ABSTRACT

An upstanding hollow rotary drum is provided and is mounted for rotation about its center axis. The lower end of the drum is closed and the upper end of the drum is open. A motor is drivingly connected to the drum for rotating the latter at generally 7000 to 8000 R.P.M. and the interior of the drum includes structure for stationarily mounting one or more crab cores within the drum introduced there into through the open upper end thereof and with the crab cores being supported in generally centered position relative to the axis of rotation of the drum. The drum is of an inside diameter sufficient to enable a plurality of crab cores to be received within the drum in centered position therein and to have the outer peripheral portions of the crab cores spaced only slightly inwardly of the inner wall surfaces of the drum. The slight spacing between the outer peripheral portions of crab cores supported within the drum and the inner wall surfaces of the drum may be on the order of one-half to one and one-half inches. Accordingly, the drum includes an inside diameter of between four and seven and one-half inches, inasmuch as most crab cores have a maximum dimension of between three and four inches.

14 Claims, 7 Drawing Figures

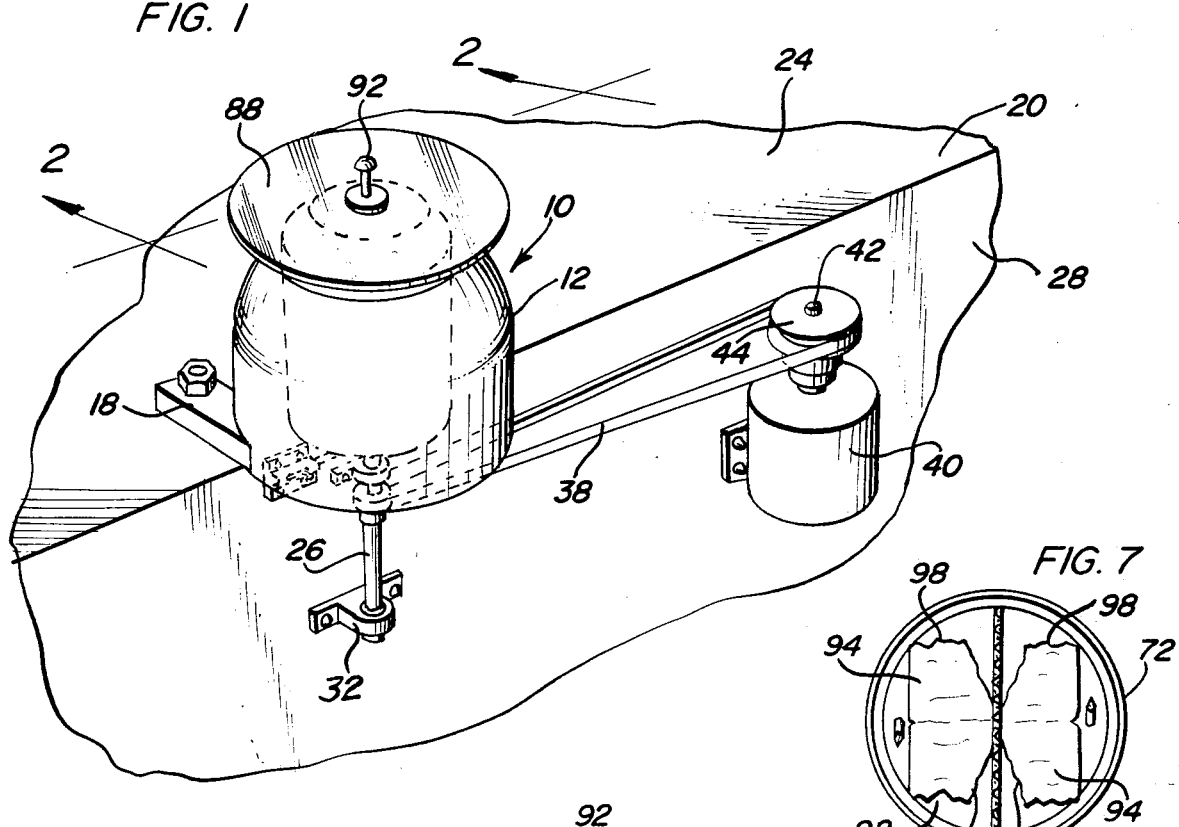
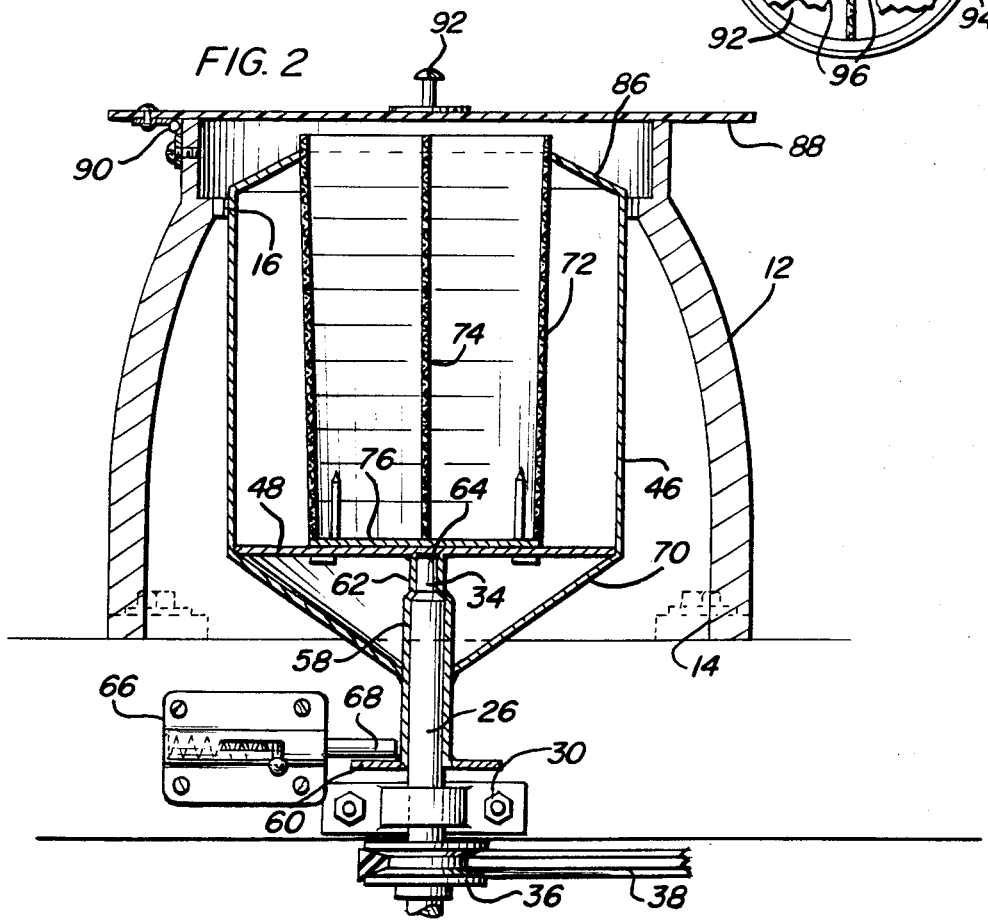

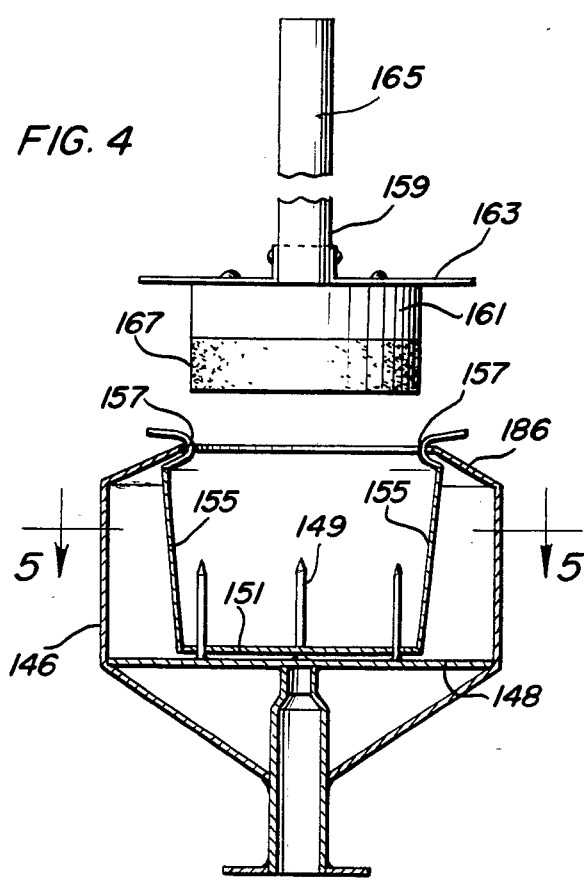
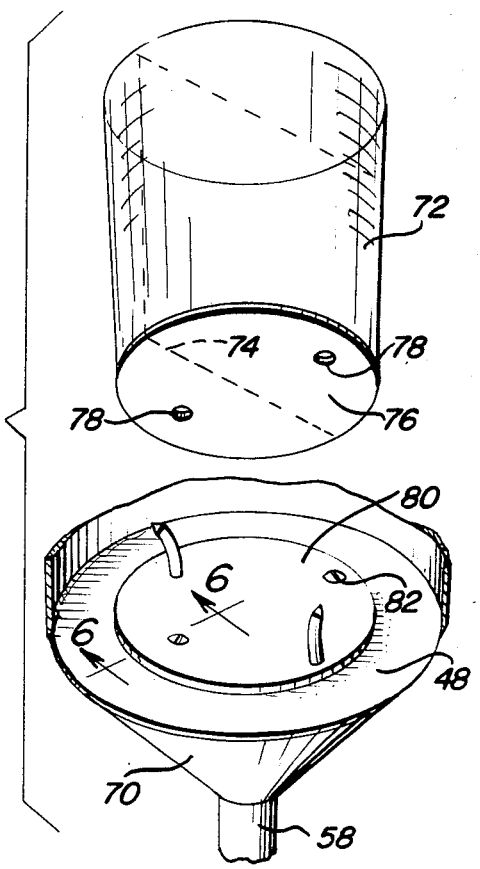
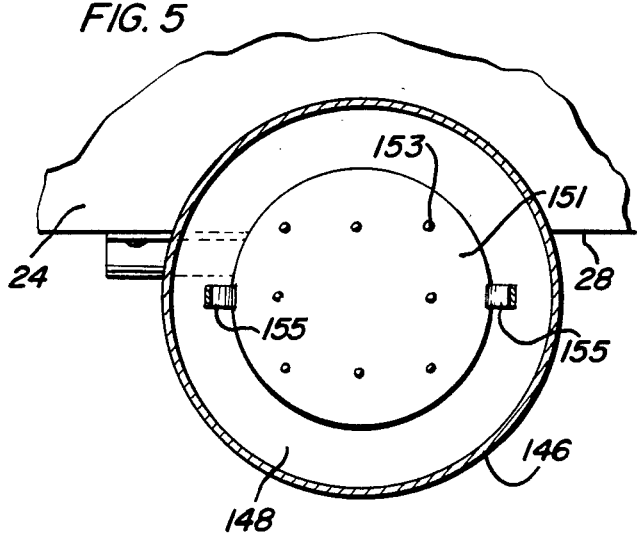
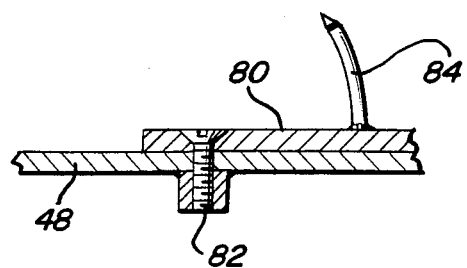

METHOD AND APPARATUS FOR EXTRACTING MEAT FROM CRAB CORES

BACKGROUND OF THE INVENTION

Various different forms of centrifugal force producing devices heretofore have been designed for removing the meat from crustacea such as blue crabs. However, many of these previously known devices have not been primarily designed for use in extracting meat from crab cores in a manner such that the core meat may be efficiently extracted and collected with minimum tearing and breaking up of the extracted meat.

Although centrifugal meat extraction from crab claws and other crab appendages may be practiced, it has been found that skilled labor can efficiently extract meat from crab claws and other appendages substantially as fast as the same amount of labor can properly position crab claws and other appendages in a centrifugal type extractor, operate the extractor to accomplish a meat extracting operation and then unload the extractor preparatory to again loading the extractor with crab claws and other crab appendages.

Accordingly, a need exists for an apparatus specifically designed to extract meat from crab cores only and to perform the meat extracting operation in a manner such that the meat is extracted with minimum tearing and shredding of the extracted meat.

Examples of various forms of extracting devices including some of the general structural and operational features of the instant invention are disclosed in U.S. Pat. Nos. 933,609, 1,175,037, 1,520,190, 2,522,578, 3,229,325 and 3,548,449.

BRIEF DESCRIPTION OF THE INVENTION

The meat extracting apparatus of the instant invention has been specifically designed for extracting meat from crab cores, only. Meat to be extracted from claws and other appendages of crabs may be readily accomplished at a reasonable speed, but efficient manual extraction of meat from crab cores is time-consuming and difficult. In addition, manual extraction of meat from crab cores as well as centrifugal force extraction of meat therefrom can result in excessive tearing and breaking up of the extracted meat during the extraction process.

The extractor of the instant invention includes an upright rotary drum which is closed at its bottom, open at its top and driven at between 7000 and 8000 R.P.M. Structure is provided within the drum for supporting a plurality of crab cores therewithin in centered position relative to the drum and with the peripheral portions of the crab cores from which meat is to be extracted spaced only slightly from the inner wall surfaces of the drum. Accordingly, the drum diameter must be maintained relatively small and it is to be noted that the crab cores from which meat is to be extracted are spun within the drum and at the same speed of rotation as the latter. Therefore, no relative rotational movement exists between the crab cores from which meat is to be extracted and the surfaces of the drum against which the extracted meat impacts during centrifugal extraction thereof.

The main object of this invention is to provide an apparatus by which meat may be extracted from crab cores in an efficient and inexpensive manner.

Another object of this invention is to provide a crab core meat extraction apparatus which will be capable of performing the desired meat extraction function with minimum tearing and breaking up of the extracted meat.

A still further important object of this invention is to provide a meat extractor in accordance with the preceding object and which will also be capable of extracting meat juices from the crab core together with the meat being extracted therefrom and in a manner whereby the meat juices may be retained by the extracted meat during the extraction process.

Another very important object of this invention is to provide a crab core meat extraction apparatus which will be capable of efficiently extracting crab core meat during a small scale meat extraction process and which will therefore be efficiently usable by ultimate users or sellers of crab meat.

A final object of this invention to be specifically enumerated herein is to provide a method and apparatus for extracting meat from crab cores which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the crab core meat extracting apparatus of the instant invention;

FIG. 2 is an enlarged fragmentary vertical sectional view taken substantially upon the plane indicated by the section line 2—2 of FIG. 1;

FIG. 3 is a fragmentary exploded perspective view of the crab core supporting basket illustrated in FIG. 2 and the coacting portions of the bottom wall of the drum illustrated in FIG. 2;

FIG. 4 is a vertical sectional view illustrating a modified form of drum incorporating an empty crab core removal apparatus as well as crab core impaling and positioning structure operatively associated therewith;

FIG. 5 is a horizontal sectional view taken substantially upon the plane indicated by the section line 5—5 of FIG. 4 and with the outer stationary housing portion of the extractor illustrated in FIGS. 1 and 2 removed;

FIG. 6 is a fragmentary enlarged vertical sectional view taken substantially upon the plane indicated by the section line 6—6 of FIG. 3; and:

FIG. 7 is a top plan view of the center partition equipped crab core receiving basket utilized in the embodiment illustrated in FIGS. 1 and 2.

DETAILED DESCRIPTION OF THE INVENTION

Referring now more specifically to the drawings the numeral 10 generally designates the crab core meat extracting apparatus of the instant invention. The apparatus 10 includes a stationary hollow housing 12 open at its bottom end as at 14 and also open at its upper end as at 16. The housing 12 includes a pair of laterally outwardly projecting support arms 18 by which the housing 12 is supported in cantilever fashion from one marginal edge portion 20 of a worktable 24 or the like.

A combined power and support shaft 26 is journaled from one side 28 of the worktable 24 extending downwardly from the marginal edge portion 20 with upper and lower journal blocks 30 and 32 journaling the upper and lower ends of the shaft 26. The upper end of the shaft 26 includes a non-circular terminal end 34 and the mid-portion of the shaft 26 includes a torque input pulley 36 mounted thereon between the journal blocks 30 and 32 and about which an endless flexible drive belt 38 is trained. An electric motor 40, which may be of the variable speed type, is mounted on the side 28 and includes a rotary output shaft 42 upon which a torque output pulley 44 is mounted. The belt 38 is also trained about the pulley 44 and therefore drivingly connects the shaft 42 to the shaft 26.

An upstanding cylindrical drum 46 is provided and includes a lower bottom wall 48 closing the lower end of the drum and a central depending hollow sleeve 58 supported from the bottom wall. The lower end of the sleeve 58 includes a radially outwardly projecting circumferential abutment flange 60 and the upper end of the sleeve 58 includes a diametrically reduced portion 62 which defines a non-circular interior pocket 64.

The sleeve 58 is downwardly telescopingly engageable over the upper end of the shaft 26 with the non-circular terminal end 34 conforming to and telescoped into the pocket 64 for keying the drum 46 to the shaft 26 for rotation therewith. A latch assembly 66 is supported from the side 28 and includes a spring projected latch pin 68 projectable inwardly over the adjacent marginal portion of the abutment flange 60 to releasably retain the sleeve 58 on the upper end of the shaft 26 against upward removal therefrom.

The drum 46 includes an inverted conical portion 70 interconnected between the outer peripheral portions of the bottom wall 48 and the longitudinal mid-portion of the sleeve 58. Accordingly, the portion 70 provides substantial bracing between the sleeve 58 and the drum 46.

The upper end of the drum 46, when the latter is mounted on the shaft 26 in the manner illustrated in FIG. 2, terminates upwardly a spaced distance below the upper end of the housing 12. A generally cylindrical but slightly downwardly tapering wire basket 72 is snugly downwardly receivable within the drum 46 through the open upper end thereof and includes a center diametric partition 74. The lower end of the basket 72 is closed by a bottom wall 76 having diametrically opposite apertures 78 formed therethrough and the bottom wall 48 of the drum 46 includes a circular plate 80 secured over the center portion thereof by removable fasteners 82 and the circular plate 80 includes a pair of diametrically opposite upwardly projecting anchoring pins 84 upwardly receivable through the apertures 58 upon downward insertion of the wire basket 72 into the drum 46. The pins are curved or angled in the direction of intended rotation of the shaft 26 and thereby serve not only to anchor the lower end of the wire basket 72 centrally within the drum 46 but also to key the wire basket 72 to the drum 46 for rotation therewith.

The upper end of the wire basket 72 projects slightly above the upper end portion of the drum 46 which includes an inwardly angled upper terminal end 86 for the purpose of ensuring retention of extracted crab meat and juices within the drum 46 during rotation thereof. The upper end of the wire basket 72 is snugly received through the upper end of the drum 46 in order to stabilize the upper end of the basket 72 within the drum 46. Also, the slight downward tapering of the wire basket 42 facilitates downward insertion of the basket 52 through the upper end of the drum 46.

The upper end of the housing 12 includes a transparent cover disk 88 hingedly supported therefrom as at 90 and equipped with a central upwardly projecting finger grip 92 whereby the cover disk 88 may be readily swung to the open position.

In operation, one or two pairs of crab cores 94 may be placed within the basket 72 in the manner illustrated in FIG. 7 of the drawings wherein the inclined upper surfaces 96 of the crab cores extend generally along radii of the drum 72 to facilitate meat extraction from the cores 94 through the open marginal edges 98 thereof, the crab cores previously being prepared for meat extraction therefrom as illustrated in the right-hand portion of FIG. 7 of U.S. Pat. No. 3,548,449, to W. L. Lockerby.

After the crab cores 94 have been placed within the basket 72 and the basket 72 has been downwardly inserted into the drum 46 in the manner illustrated in FIG. 2 and the cover disk 88 has been swung to the closed position, the motor 40 may be actuated in order to spin the drum 46 at a speed generally between 7000 and 8000 R.P.M. Spinning of the crab cores 94 at this speed will cause at least substantially all of the meat therein to be removed therefrom by centrifugal force with the meat passing outwardly through the open edges 98 of the cores 94, through the openings in the wire wall portions of the basket 72 and impacting on the inner surfaces of the drum 46. The wire mesh of which the basket side walls is formed may be quite coarse and define relatively large openings therethrough. In this manner, substantially all of the meat may be extracted from the crab cores 94 without tearing or breaking up the meat. In addition, as the meat is extracted from the crab cores the meat juices are also extracted therefrom.

With attention now invited more specifically to FIGS. 4 and 5 of the drawings, there may be seen a modified form of drum 146 which may be used in lieu of the drum 46 and in conjunction with a somewhat foreshortened housing (not shown) but otherwise similar to the housing 12. The drum 46 includes a bottom wall 148 upwardly from which eight generally vertical spikes 149 project and the drum 146 is designed to receive one or two crab cores 94 therein disposed in horizontal position (as opposed to the vertical positions thereof illustrated in FIG. 7) with the cores 94 impaled on the spikes 194. However, an extractor plate 151 is provided for closely overlying the bottom wall 148 and includes eight apertures 153 formed therethrough upwardly through which the spikes 149 project. Diametrically opposite portions of the extractor plate 151 include upwardly projecting spring arms 155 including reversely curved upper ends 157 which embracingly engage the upper inwardly directed terminal end portions 186 of the drum 146.

Crab cores to be spun within the drum 146 may be sequentially introduced into the drum 146 through the open upper end thereof and pressed downward upon the impaling spikes 149 by a tool 159 provided for this purpose. The tool 159 includes a disk-shaped body 161 over which a disk-shaped stop flange 163 is supported and an upstanding handle 165 projects upwardly from the center portion of the stop flange 163. In addition, a resilient disk-shaped body 167 underlies the body 161 and is engageable with the uppermost crab core disposed within the drum 146 in order to downwardly force one or two crab cores disposed within the drum 146 onto the impaling spikes 149.

Of course, the impaling spikes 149 serve to maintain the crab cores within the drum 146 in stationary position relative thereto during high speed rotation of the drum 146 and extraction of the meat and meat juices from the crab cores. After the crab core extracting process has been completed and the drum 146 has stopped rotating, the upper ends of the spring arms 155 may be engaged, inwardly displaced toward each other and have an upward manual pull exerted thereon in order to strip the empty crab core shells from the spikes 149. Then, the drum 146 may be removed and inverted in order to discharge the extracted crab meat and crab meat juices therefrom.

It is extremely important that the crab cores 94 from which crab meat is to be extracted be stationarily positioned within the drum 46 or the drum 146 and that the inner surfaces of the walls of the drums 46 and 146 be only slightly spaced outward of the crab cores 94 contained within the drum. In this manner, the crab meat may be centrifugally extracted from the cores with minimal breaking up of the crab meat.

It is pointed out that the drum 146 may handle two crab cores at a time while the drum 46 may handle as many as four crab cores at the same time, depending upon the size of the crab cores. Accordingly, the crab core extracting apparatus is not designed for high volume operation but is designed primarily for occasional usage and to provide a means whereby unskilled persons may extract crab meat from crab cores in a minimum of time and at a minimum of expense.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for extracting meat from crab cores with minimum tearing of the extracted meat, said apparatus including an upstanding hollow drum, means journaling said drum for rotation about its center axis, drive means coupled to said drum for rotating the latter at high rotational speeds, said drum being closed at its bottom and open at its top, support means stationarily supported within said drum and removable through the open top thereof for supporting crab cores in a stationary centered position within said drum, said support means including means for supporting at least one crab core in substantially centered position within said drum with the open side edges of said crab core facing in generally opposite radial outward directions from said center axis.

2. The apparatus of claim 1 wherein said drum has an inside diameter of generally four to seven and one-half inches.

3. The apparatus of claim 2 wherein said drive means is operative to rotate said drum at a rotational speed of generally between 7000 and 8000 R.P.M.

4. An apparatus for extracting meat from crab cores with minimum tearing of the extracted meat, said apparatus including an upstanding hollow drum, means journaling said drum for rotation about its center axis, drive means coupled to said drum for rotating the latter at high rotation speeds, said drum being closed at its bottom and open at its top, support means stationarily supported with in said drum and removable through the open top thereof for supporting crab cores in a stationary centered position within said drum, said drum having an inside diameter of generally four to seven and one-half inches, said support means including a cylindrical coarse mesh wire basket removably mounted in said drum in centered position therein and said basket includes a diametric center partition dividing the interior thereof into two one-half cylindrical compartments in which a pair of horizontally registered crab cores may be received in vertical positions with the upper surfaces of the cores opposing opposite sides of said partition, the undersurfaces of said cores facing radially outwardly of said basket and the open cut opposite edges of said cores facing generally radially outwardly of said basket and the open cut opposite edges of said cores facing generally radially outwardly of said basket.

5. The apparatus of claim 3 wherein the upper end of said drum is diametrically reduced and the upper end of said basket is snugly slidably received through said diametrically reduced upper end of said drum.

6. An apparatus for extracting meat from crab cores with minimum tearing of the extracted meat, said apparatus including an upstanding hollow drum, means journaling said drum for rotation about its center axis, drive means coupled to said drum for rotating the latter at high rotational speeds, said drum being closed at its bottom and open at its top, support means stationarily supported within said drum and removable through the open top thereof for supporting crab cores in a stationary centered position within said drum, said drum having an inside diameter of generally four to seven and one-half inches, said support means includes a cylindrical coarse mesh wire basket removably mounted in said drum in centered position therein and said basket includes a diametric center partition dividing the interior thereof into two one-half cylindrical compartments in which a pair of horizontally registered crab cores may be received in vertical positions with the upper surfaces of the cores opposing opposite sides of said partition, the undersurfaces of said cores facing radially outwardly of said basket and the open cut opposite edges of said cores facing generally radially outwardly of said basket and the open cut opposite edges of said cores facing generally radially outwardly of said basket, said drum including a bottom wall including upwardly projecting anchor pins spaced radially outwardly from and about the center axis of said drum and inwardly from the side walls thereof, the lower end of said basket including a bottom wall having openings formed therethrough upwardly through which said pins are receivable upon downward insertion of said basket into said drum, said pins being angled in the direction of rotation of said drum.

7. An apparatus for extracting meat from crab cores with minimum tearing of the extracted meat, said apparatus including an upstanding hollow drum, means journaling said drum for rotation about its center axis, drive means coupled to said drum for rotating the latter at high rotational speeds, said drum being closed at its bottom and open at its top, support means stationarily supported within said drum and removable through the open top thereof for supporting crab cores in a stationary centered position within said drum, said drum having an inside diameter of generally four to seven and one-half inches, said support means including a base plate having a plurality of peripherally and angularly spaced openings formed therethrough, said drum including a bottom wall having upwardly projecting pins supported therefrom, said pins being being receivable upwardly through said openings upon downward insertion of said base plate into the lower portion of said drum for keying said base plate to said drum for rotation therewith, peripherally spaced portions of said base plate including upwardly projecting spring arms supported therefrom including reversely curving upper terminal ends, said drum including an axially short diametrically reduced upper end portion with which said reversely curving upper ends of said spring arms are seatingly engaged to releasably prevent upward movement of said base plate relative to said drum.

8. The method of extracting meat from hard shell crab cores, said method including providing an upstanding generally cylindrical drum of an inside diameter of between one and three inches greater in diameter than the maximum horizontal dimension of a crab core to have crab meat extracted therefrom, stationarily supporting one or more juxtapositioned crab cores within said drum in substantially centered position therein with the open side edges of each crab core facing in generally opposite radial outward directions from the center axis of said drum, rotating said drum substantially about its center axis at a speed sufficient to centrifugally extract at least substantially all of the meat within said crab cores through the open side edges thereof and allowing said meat to impact with and be retained by the inner surfaces of said drum, terminating rotation of said drum, removing the empty crab cores from said drum and then removing the extracted meat from said drum.

9. The method of claim 8 wherein said crab cores are positioned in substantially horizontal positions within said drum and juxtapositioned crab cores are vertically stacked relative to each other.

10. The method of claim 8 wherein said juxtapositioned crab cores are disposed in said drum in horizontally juxtaposed positions with the upper surfaces of said crab cores opposing each other and the undersurfaces of said crab cores facing outwardly and in opposite directions toward the inner surfaces of said drum.

11. An apparatus for abstracting meat from crab cores with minimum tearing of the extracted meat, a journaled upstanding support shaft including a non-circular upper end portion, a generally cylindrical drum closed at its bottom and open at its top, a central support sleeve dependingly supported from said drum and downwardly telescopingly engageable over the upper end portion of said shaft in keyed engagement therewith for rotation with said shaft, means for driving said shaft at high rotational speed, and support means removably mounted within said drum and removable through the open top thereof for supporting at least one crab core in centered position within said drum, said support means including means for supporting at least one crab core in substantially centered portion within said drum with the open side edges of said crab core facing in generally opposite radial outward duration from the axis of rotation of said shaft.

12. The apparatus of claim 11 including means operative to releasably lock said sleeve against upward retraction relative to said shaft during rotation of the latter.

13. The apparatus of claim 11 including a stationary tubular housing loosely enclosing said drum, said housing including an upwardly opening upper portion closely embraced by the upper portion of said drum.

14. The assembly of claim 13 wherein said housing includes a closure member shiftably supported therefrom for movement into and out of position closing the upper portion of said housing immediately above the upper end of said drum.

* * * * *